United States Patent

Welp

[11] Patent Number: 5,121,157
[45] Date of Patent: Jun. 9, 1992

[54] CAD APERTURE CARD LASER PLOTTERS

[75] Inventor: Ulrich Welp, Bad Nauheim, Fed. Rep. of Germany

[73] Assignee: Microbox Dr. Welp KG, Bad Nauheim, Fed. Rep. of Germany

[21] Appl. No.: 648,880

[22] Filed: Jan. 31, 1991

[30] Foreign Application Priority Data

Feb. 14, 1990 [DE] Fed. Rep. of Germany ....... 4004465

[51] Int. Cl.$^5$ .................. G03B 27/52; G03B 27/30
[52] U.S. Cl. ........................ 355/27; 355/43; 355/100
[58] Field of Search ............ 355/19, 40, 41, 100

[56] References Cited

U.S. PATENT DOCUMENTS

| 3,535,039 | 10/1970 | Lakin et al. | 355/100 |
| 4,634,269 | 1/1987 | Welp et al. | 355/100 |
| 4,742,374 | 5/1988 | Yamamoto et al. | 355/27 |
| 5,005,043 | 4/1991 | Kobayashi et al. | 355/27 |

FOREIGN PATENT DOCUMENTS

| 2944539 | 5/1980 | Fed. Rep. of Germany . |
| 3615780 | 11/1987 | Fed. Rep. of Germany . |
| 3739719 | 6/1988 | Fed. Rep. of Germany . |
| 3839583 | 7/1989 | Fed. Rep. of Germany . |
| 3808526 | 9/1989 | Fed. Rep. of Germany . |

OTHER PUBLICATIONS

Teicher, Gerhard: Handbuch der Fototechnik, Aug., 1963, VEB Fotokinoverlag Halle, p. 444.
Angerer, Ernst: Wissenschaftliche Photographie, Aug., 1956, Akademische Verlagsgesellschaft Geest & Portig KG, Leipzig, p. 42.
Ganzhorn, Karl: Optische Kopplung Mensch-Datenverarbeitungsanlage, Umschau, 1967, H2, pp. 42–46.

Primary Examiner—Michael L. Gellner
Assistant Examiner—D. Rutledge
Attorney, Agent, or Firm—Wegner, Cantor, Mueller & Player

[57] ABSTRACT

In a CAD aperture card laser plotter operating with pre-exposed silver halide reversal film, an exposure device which exposes the entire frame is provided in addition to a laser exposure station. The background density of the reversal film can therefore be reduced so that finer lines can be portrayed than otherwise possible with a laser exposure station.

8 Claims, 1 Drawing Sheet

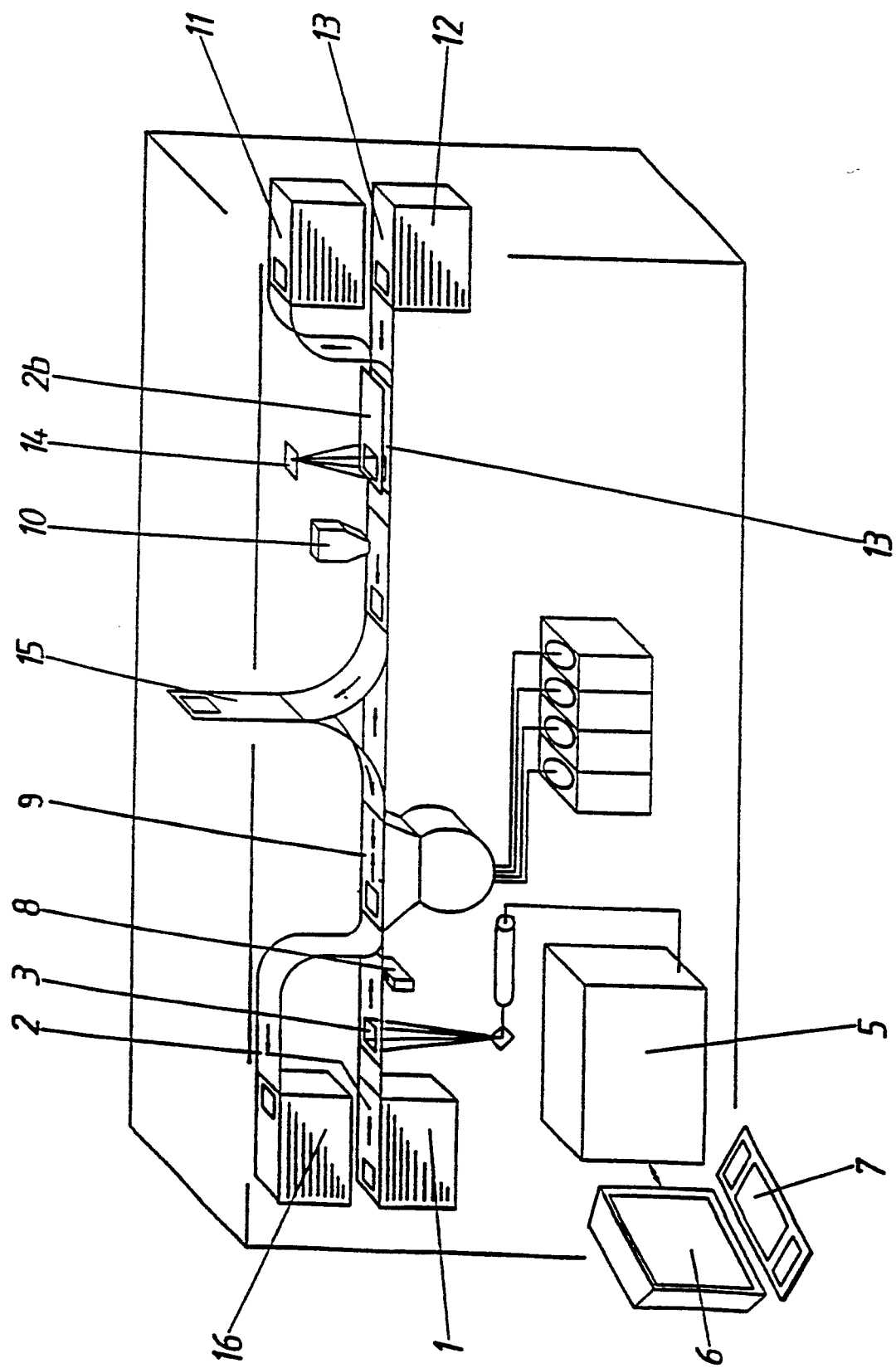

CAD APERTURE CARD LASER PLOTTERS

FIELD OF INVENTION

This invention relates to a CAD aperture card laser plotter which has a laser exposure station for exposing a pre-exposed silver halide reversal film by means of a laser beam and a developing station for the exposed aperture cards. Such a CAD aperture card laser plotter is illustrated in FIG. 3 of EPA-A-0171572 and is described in the specification.

BACKGROUND OF THE INVENTION

The known CAD aperture card laser plotter allows CAD drawings to be produced directly on aperture cards by means of the laser beam. As the laser beam is to reproduce the lines of the drawing in a negative on the film, it has to be a reversal film in which white lines are formed by laser exposure. Such reversal films operate by the solarization principle. They are pre-exposed by the film manufacturer so that they receive a uniformly dark background having a density of about 1.8 or higher during full development. This high background density gives rise to problems during the production of paper enlargements. As the internationally standardised density of 35 mm negatives is between 0.9 and 1.2 for microfilming of drawings, the light intensity in the automatic enlargers is not sufficient constantly to reproduce fine lines with substantially denser negatives. The line width in the negative of the reversal film depends on the intensity of pre-exposure in addition to the concentration of the exposure beam. As pre-exposure takes place very intensively in reversal film for laser exposure, the edge regions of fine lines also rapidly become black during development so that too little or even no light of the automatic enlarger penetrates through the fine lines of few micrometers width onto the enlargement medium—paper or electrostatic printing drum.

This defect could be overcome by influencing the development process and, for example, developing the film less. The disadvantage arises here, however, that uniform development and therefore also density of the entire film surface cannot be achieved.

SUMMARY OF THE INVENTION

The object of the invention is to construct a CAD aperture card laser plotter of the type mentioned at the outset such that very fine lines of the drawing can be reproduced when using pre-exposed silver halide reversal film.

According to the invention this object is achieved in that an exposure device which uniformly exposes the entire frame is provided before the development station.

This very simple addition to a CAD aperture card laser plotter allows the background density, determined by the manufacturer during production of the film owing to the pre-exposure in the case of reversal films, to be reduced to an optimum value for microfilm technology by a further exposure process in the CAD aperture card laser plotter. The further exposure process results in desensitisation of the silver halide so fine lines do not coalesce even in the event of through-development of the silver halide layer. Owing to the invention, therefore, aperture cards which even reproduce fine lines well and have a negative density of 0.9 to 1.2 which is normal with aperture cards can be produced very economically. This is particularly important if the aperture cards are enlarged or duplicated together with negatives produced by a conventional method in the stack.

It is advantageous if the exposure device is arranged between the development station and the laser exposure station.

The exposure device could uniformly illuminate and therefore expose the entire frame. The production costs for the exposure station are particularly low if the exposure device is a light source arranged transversely to the path of movement of the aperture card and extending over the width of the frame.

BRIEF DESCRIPTION OF THE DRAWING

The invention will now be described in detail, by way of example, with reference to the drawing which is a perspective view of one embodiment of a CAD aperture card laser plotter constructed according to the invention.

DETAILED DESCRIPTION OF PREFERRED EMBODIMENT

Referring to the drawing, the illustrated CAD aperture card laser plotter has an original card magazine 1 from which unexposed aperture cards 2 can be conveyed to a laser exposure station 3. This laser exposure station 3 has a laser tube 4 which is controlled by a computer 5. A graphics screen 6 and a keyboard 7 for inputting control commands are also shown in the drawing.

After passing through the laser exposure station 3, the aperture card 2 travels through an exposure device 8 which uniformly exposes the entire frame and therefore reduces the background density of the silver halide reversal film to be used.

After exposure, the respective aperture card 1 is conveyed to a development station 9 where the film is developed, fixed and washed. After development, the aperture card 2 passes to a printing station 10 where it is marked with machine-readable identification data. The aperture card 2 then passes to an original card stacker 11.

The CAD aperture card laser plotter also allows duplicate cards to be produced. For this purpose, it has a duplicate card magazine 12 with unexposed duplicate cards 13 which correspond to the original aperture cards 2 but are equipped with silver duplicating film. The duplicate cards are conveyed to the duplicating station 14 where they pass beneath the aperture card 2b to be duplicated and in which exposure takes place by the contact exposure process.

During contact exposure, the emulsion side of the duplicate cards 13b faces upward. During development in the development station 9, however, they have to face downward so that they can be chemically treated. A turning station 15 is therefore provided between the printing station 10 and the development station 9.

After development, the duplicate cards 13 pass to a duplicate card stacker 16 arranged above the original card magazine 1.

The invention is not restricted to the above-described embodiment but numerous variations and modifications are possible without departing from the spirit and scope of the invention as defined by the appended claims.

I claim:

1. A CAD aperture card laser plotter comprising:

(a) a laser exposure station for exposure of a pre-exposed silver halide reversal film of an aperture card by means of a laser beam;

(b) a development station for developing exposed aperture cards; and (c) an exposure device for uniformly exposing the entire frame of an aperture card provided before the development station.

2. A CAD aperture card laser plotter as claimed in claim 1, in which the exposure device is arranged between the development station and the laser exposure station.

3. A CAD aperture card laser plotter as claimed in claim 1, in which the exposure device is a light source arranged transversely to the path of movement of the aperture cards and extending over the width of the frame.

4. A CAD aperture card laser plotter as claimed in claim 3, in which the exposure device is arranged between the development station and the laser exposure station.

5. A CAD aperture card laser plotter as claimed in claim 1, further comprising a printing station for printing data on developed aperture cards.

6. A CAD aperture card laser plotter as claimed in claim 1, further comprising a station for exposing unexposed duplicate cards by a contact exposure process from developed aperture cards.

7. A CAD aperture card laser plotter as claimed in claim 2, further comprising a printing station for printing data on developed aperture cards.

8. A CAD aperture card laser plotter as claimed in claim 2, further comprising a station for exposing unexposed duplicate cards by a contact exposure process from developed aperture cards.

* * * * *